(12) United States Patent
Schoenhoff et al.

(10) Patent No.: US 11,125,088 B2
(45) Date of Patent: Sep. 21, 2021

(54) STACKING OF ROTOR BLADES ON CENTROIDS

(71) Applicant: MTU Aero Engines AG, Munich (DE)

(72) Inventors: Carsten Schoenhoff, Munich (DE); Martin Pernleitner, Dachau (DE); Klaus Wittig, Roehrmoos (DE); Manfred Dopfer, Unterschleissheim (DE); Marcus Woehler, Inning am Ammersee (DE); Wilfrid Schuette, Oberhaching-Furth (DE); Christoph Bichlmaier, Greifenberg (DE); Rudolf Stanka, Rattenkirchen (DE); Norman Cleesattel, Zorneding (DE)

(73) Assignee: MTU Aero Engines AG, Munich (DE)

( * ) Notice: Subject to any disclaimer, the term of this patent is extended or adjusted under 35 U.S.C. 154(b) by 903 days.

(21) Appl. No.: 15/364,892

(22) Filed: Nov. 30, 2016

(65) Prior Publication Data

US 2017/0159461 A1 Jun. 8, 2017

(30) Foreign Application Priority Data

Dec. 3, 2015 (DE) .......................... 102015224151.3

(51) Int. Cl.
*F01D 5/30* (2006.01)
*F01D 5/14* (2006.01)
(Continued)

(52) U.S. Cl.
CPC ................ *F01D 5/30* (2013.01); *F01D 5/02* (2013.01); *F01D 5/141* (2013.01); *F01D 5/225* (2013.01);
(Continued)

(58) Field of Classification Search
CPC .............. F01D 5/141; F05D 2220/323; F05D 2240/301; F05D 2250/231; F05D 2250/232
See application file for complete search history.

(56) References Cited

U.S. PATENT DOCUMENTS

| 1,027,201 A | 7/1911 | Grun |
| 4,682,935 A | 7/1987 | Martin |
| (Continued) | | |

FOREIGN PATENT DOCUMENTS

| DE | 4344189 | 8/1995 |
| DE | 60216360 | 9/2007 |
| (Continued) | | |

*Primary Examiner* — Richard A Edgar
*Assistant Examiner* — Jackson N Gillenwaters
(74) *Attorney, Agent, or Firm* — Davidson, Davidson & Kappel, LLC

(57) ABSTRACT

A rotor blade for a gas turbine, in particular an aircraft gas turbine, having a blade root element and a stream deflection portion adjoining the blade root element (12) in the longitudinal direction of the blade (RR); respective centroids (24) of blade cross-sectional areas of the stream deflection portion residing on a common stacking axis (26). It is provided that, starting from a first centroid (24) of a first blade cross-sectional area adjoining the blade root element (12), the stacking axis (26) extend within a cone (28) whose apex resides within the first centroid (24), and whose cone height (KH) extends orthogonally to the plane of the blade cross-sectional area; the angle (β) of the cone (28) being greater than 0° and smaller than or equal to 4°; preferably greater than or equal to 0.5° and smaller than or equal to 2°.

14 Claims, 2 Drawing Sheets

(51) Int. Cl.
*F01D 5/02* (2006.01)
*F01D 5/22* (2006.01)
*F02C 7/36* (2006.01)

(52) U.S. Cl.
CPC .......... *F02C 7/36* (2013.01); *F05D 2220/323* (2013.01); *F05D 2240/24* (2013.01); *F05D 2240/301* (2013.01); *F05D 2240/307* (2013.01); *F05D 2250/231* (2013.01); *F05D 2250/232* (2013.01); *F05D 2300/606* (2013.01)

(56) References Cited

U.S. PATENT DOCUMENTS

| | | | |
|---|---|---|---|
| 575,620 | A | 11/1996 | Haller et al. |
| 6,554,572 | B2 | 4/2003 | Rinck et al. |
| 7,740,451 | B2 | 6/2010 | Greim et al. |
| 2009/0133380 | A1* | 5/2009 | Donnerhack ............. F02C 7/08 60/39.511 |
| 2012/0057982 | A1* | 3/2012 | O'Hearn ................ F01D 5/141 416/223 A |
| 2013/0224049 | A1 | 8/2013 | Schwarz et al. |
| 2016/0319676 | A1 | 11/2016 | Benichou et al. |

FOREIGN PATENT DOCUMENTS

| | | | |
|---|---|---|---|
| DE | 112006001614 | 5/2008 | |
| EP | 1507064 A2 | 2/2005 | |
| EP | 1258597 | 11/2006 | |
| EP | 2915962 | 9/2015 | |
| FR | 3014942 A1 | 6/2015 | |
| GB | 260411 | 11/1926 | |
| GB | 260411 A * | 11/1926 | ............. F01D 5/141 |
| JP | 4299301 B2 * | 7/2009 | ............. F01D 5/225 |
| WO | WO2008/035135 | 3/2008 | |

* cited by examiner

STACKING OF ROTOR BLADES ON CENTROIDS

The present invention relates to a rotor blade for a gas turbine, in particular an aircraft gas turbine, having a blade root element and a stream deflection portion adjoining the blade root element in the longitudinal direction of the blade; respective centroids of blade cross-sectional areas of the stream deflection portion residing on a common stacking axis. The stream deflection portion is typically an airfoil having a convex suction side and a concave pressure side joined to one another by leading and trailing edges. The blade cross-sectional areas are derived as sections through the stream deflection portion having cylindrical surfaces concentrically disposed about the machine axis of the gas turbine.

Directional indications, such as "axial," "radial" and "circumferential" are to be basically understood as relative to the machine axis of the gas turbine, unless otherwise explicitly or implicitly derived from the context.

BACKGROUND

In the development of aircraft gas turbines, it was recognized that an optimized operation is made possible by decoupling the two components normally seated on a shaft: the low-pressure turbine and the fan. In such aircraft gas turbines, the low-pressure turbine and the fan are coupled to one another by a reduction gear; the low-pressure turbine rotating approximately three times faster than the fan. Such low-pressure turbines are also referred to as high-speed low-pressure turbines.

Due to the difference in, in particular the higher speed of the low-pressure turbine in comparison to conventional aircraft (gas turbines), the rotor blades, which are secured to a rotor of a turbine stage, are subject to higher centrifugal forces. Besides the increased centrifugal forces, it is also necessary to allow for the oncoming hot gas flow forces.

In conventional aircraft gas turbines, it is known for the stacking axis of blade cross-sectional areas to be inclined by up to 5 degrees relative to a purely radial direction (in relation to the center point of the gas turbine); optimal inclinations residing within the range of approximately 2.5° to 4.5° for the more slowly rotating conventional low-pressure turbines.

It turns out that it is problematic to use conventional rotor blades in aircraft gas turbines having high-speed low-pressure turbines because localized stress peaks occur in the rotor blades, and an uneven loading of the rotor blades could be ascertained. Overall, therefore, unfavorable stress profiles are obtained for such rotor blades and for the use thereof in high-speed rotors of a turbine stage.

In contrast, it is an object of the present invention to provide a rotor blade for a gas turbine that will overcome the mentioned disadvantages and, in particular, be suited for use in high-speed low-pressure turbines.

To achieve the objective, a rotor blade is provided where the stacking axis, starting from a first centroid of a first blade cross-sectional area adjoining the blade root element, extends within a cone whose apex resides within the first centroid, and whose cone height extends orthogonally to the plane of the blade cross-sectional areas; the cone angle being greater than 0° and smaller than 4°; preferably greater than or equal to 0.5° and smaller than or equal to 2°.

In this configuration, the cone height essentially extends along the radial direction of the gas turbine, so that, the design approach provides that the stacking axis deviate in the axial direction, respectively the circumferential direction by maximally 2° from the radial direction, respectively the cone height. In other words, the cone apex is located at the point where the stacking axis intersects an inner annulus of the turbine. It turns out that there is a difference in the ratio between centrifugal force and the oncoming hot-gas flow force, particularly in the case of high-speed low-pressure turbines, so that it is possible to achieve a more uniform loading of the rotor blades having the described design without localized stress peaks. Thus, the deviation of the rotor blades' stacking axis from the purely radial direction is within a very narrow range, which is particularly advantageous for high-speed rotors of a turbine stage, however.

It is also provided that, in the mounted state of the rotor blades on the gas turbine, the cone height or the cylinder height extend in the radial direction of the gas turbine.

It is also preferred that the stacking axis, originating from first centroid, extend linearly within the cone or within the cylinder.

To counteract the acting through-flowing hot gas forces, in the mounted state of the rotor blades on the gas turbine, it is provided that the stacking axis extend obliquely in the axial direction of the gas turbine relative to the gas flow radial direction.

To optimize the stress profile in terms of the acting higher centrifugal force, in the mounted state of the rotor blades on the gas turbine, the stacking axis may extend obliquely relative to the radial direction, in the circumferential direction of the gas turbine.

Since the shroud element forms the radially outer termination of the rotor blade and centrifugal forces likewise act thereon, it is also provided that the centroids of the cross-sectional areas of the shroud element be located on the stacking axis.

Another aspect provides that the present invention relate to a gas turbine, in particular an aircraft gas turbine that includes at least one turbine stage having a rotor, upon which a plurality of adjacently disposed rotor blades having one of the above mentioned features are circumferentially mounted.

It is preferred that the at least one turbine stage be part of a low-pressure turbine. To this end, it is also provided that the low-pressure turbine be coupled by a reduction gear to the fan of the aircraft gas turbine.

In the case of a gas turbine, it is also preferred that the respective stacking axes of the rotor blades have the same inclination relative to a respective straight line extending radially through the first centroid of the first blade cross-sectional area.

BRIEF DESCRIPTION OF THE DRAWINGS

The present invention will be explained exemplarily in the following with reference to the enclosed figures without being limited thereto.

DETAILED DESCRIPTION

Figure 1:
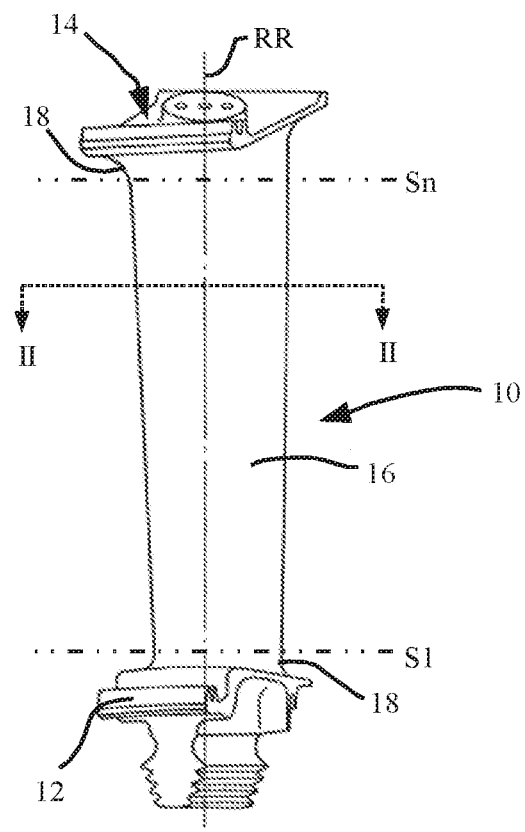
FIG. 1 shows an example of a rotor blade of an aircraft gas turbine in a perspective view.

FIG. 1 shows an exemplary perspective view of a rotor blade 10 of an aircraft gas turbine. Rotor blade 10 includes a blade root element 12, a shroud element 14, and a stream deflection portion 16 that is configured in the longitudinal direction of the blade, respectively in radial direction RR between blade root element 12 and shroud element 14. Radially inwardly and radially outwardly, stream deflection portion 16 has respective transition regions 18, in which the cross-sectional area is modified, in particular, enlarged to provide a stable, preferably one-piece connection to blade root element 12, respectively shroud element 14. Rotor blade 10 shown here is illustrated purely exemplarily in order to depict the general structure of a rotor blade. However, it is not absolutely necessary that rotor blade 10 of FIG. 1 show all features of a rotor blade 10 according to the present invention.

Figure 2:
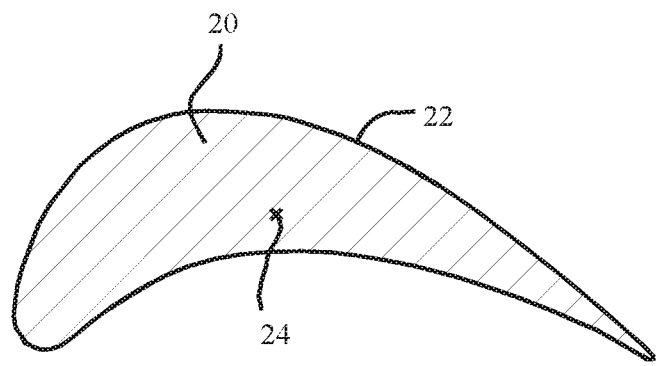
FIG. 2 shows exemplarily a rotor blade cross section.

FIG. 2 shows exemplarily a cross-sectional area 20 of a rotor blade 10, for example, in the area of line of intersection II-II of FIG. 1. Blade cross-sectional area 20 is preferably derived as a section through stream deflection portion 16 with a cylindrical surface concentrically disposed about the machine axis (not shown here) of the gas turbine. In simplified terms, this surface area may also be illustrated in a flat view in one plane, however. Cross-sectional area 20 may also be uniform over the entire length of stream deflection portion 16. Likewise conceivable, however, is a variation in outer contour 22, and thus also in cross-sectional area 20, starting from a first cross-sectional area that may be approximately located in the region of broken line S1, thus above transition region 18, up to a radially outermost cross-sectional area, that is approximately located in the region of broken line Sn, depending on the desired aerodynamic effect of rotor blade 10, respectively of stream deflection portion 16. In particular, the cross-sectional area may become smaller, preferably monotonically, radially outwardly. Here, advantages in terms of structural-mechanical requirements of rotor blades 10 are derived.

Rotor blade cross-sectional area 20 has a centroid 24 that is qualitatively indicated in the figure. The position of centroid 24 is shown purely exemplarily and not mathematically or geometrically exactly. Extending through this centroid 24 is a stacking axis (not shown in FIG. 2), along which all imaginary cross-sectional areas are disposed one over the other, respectively stacked onto each other, the stacking axis passing through the centroids of all cross-sectional areas. All of these centroids thereby reside on a straight line.

Figure 3A:
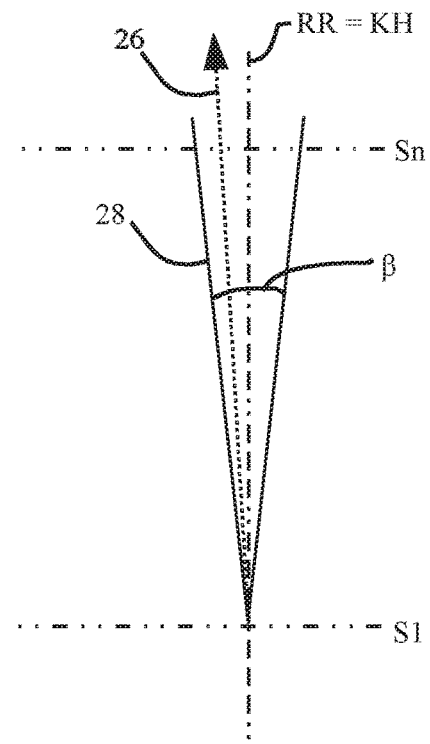
FIGS. 3A and 3B show schematically the configuration of a stacking axis relative to a cone and an oblique cylinder, respectively.
Figure 3B:
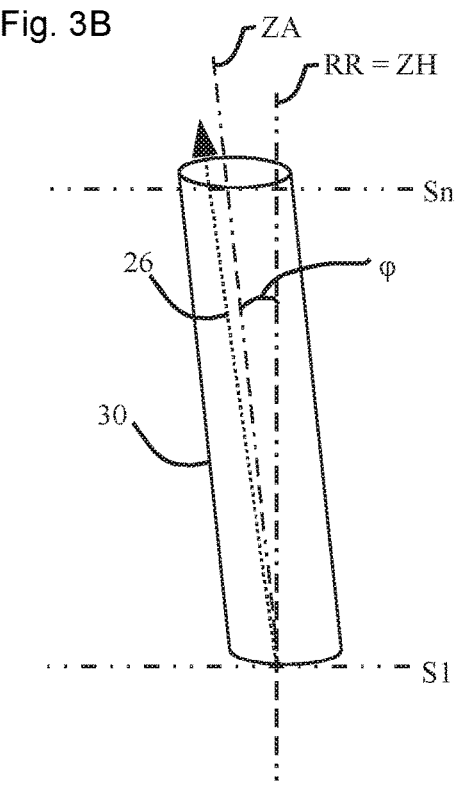

FIGS. 3A and 3B show geometric relationships between stacking axis 26 and radial direction RR for a rotor blade and the cross-sectional areas thereof. In accordance with FIG. 3A, a piercing point of radial direction RR and of stacking axis 26 is established for line S1 of the first cross-sectional area of stream deflection portion 16 (FIG. 1) in centroid 24. Stacking axis 26 extends obliquely relative to radial direction RR and thus deviates from radial direction RR. In the illustrated example, stacking axis 26 extends within a cone 28, whose apex resides in centroid 24 and whose cone height KH coincides with radial direction RR. Cone 28 has a cone angle β that resides within a range of greater than 0° to 4°. Stacking axis 26, which preferably has a linear profile starting from centroid 24 of the first cross-sectional area at radial level S1, resides within the envelope surface of cone 28. Thus, in the circumferential direction or/and in the axial direction of the gas turbine, stacking axis 26 may extend obliquely relative to radial direction RR; the deviation from the radial direction being not more than 2°, which corresponds to half of cone angle β of cone 28.

Figure 4:
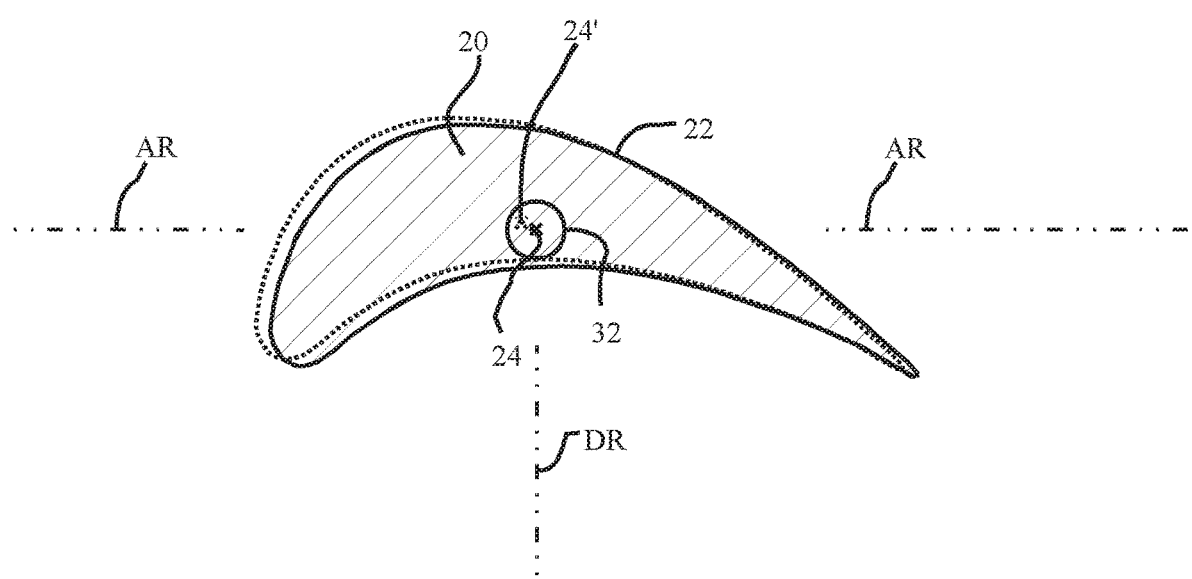
FIG. 4 shows two superimposed rotor blade cross sections at different radial positions along the stacking axis of the rotor blades.

Alternatively, stacking axis 26 may extend within an oblique cylinder 30 as shown in FIG. 3B; the oblique cylinder having a cylinder height ZH which coincides with radial direction RR and whose cylinder axis ZA is configured at an angle φ of greater than 0° to 2° to radial direction RR, respectively cylinder height ZH. In this context, the diameter of cylinder 30 may be selected as a function of a size of a specific cross-sectional area of the rotor blade; for example, the cylinder diameter could equal half of the thickness of a cross-sectional area; the thickness of the cross-sectional area being measurable, for example, in a direction of thickness DR that is orthogonal to axial direction AR of the gas turbine and that intersects centroid 24, as is indicated in FIG. 4; it also being possible for the direction of thickness DR to be understood as tangential to the circumferential direction of the gas turbine. However, this is only a simplified example. The diameter of cylinder 30 may also be selected as a function of other sizes or parameters of the rotor blade. The diameter may, in particular, also be set to any desired value that does not absolutely have a connection to the geometric dimensions of the rotor blade. In the case of the cylinder, it is especially preferred that it be axially inclined in the hot gas flow direction. This makes it possible to keep to a minimum the bending moment derived from centrifugal forces and flow pressure forces, that results at the site where the airfoil portion, respectively stream deflection portion is bonded to the blade root element.

FIG. 4 shows exemplarily two superimposed contours of rotor blade cross-sectional areas at the level of lines S1, respectively Sn in accordance with FIG. 1. As is apparent from this representation, centroid 24' of cross-sectional area at level Sn (broken line contour) deviates from centroid 24 of cross-sectional area 20 at level S1. Stacking axis 26, which is not shown in the drawing, extends through these two centroids 24 and 24' and is thus inclined to a radial direction which extends in FIG. 4 orthogonally to the paper plane through centroid 24; the angle formed between the radial direction and the stacking axis being greater than 0° and smaller than or equal to 2°. Also discernible in FIG. 4 as represented by circle 32 is the boundary defined by a cone 28 (see FIG. 3A), respectively an oblique cylinder 30 (see FIG. 3B), within which the centroids of all cross-sectional areas of the turbine blade wheel are located.

It is noted that the angles or inclinations are shown in an exaggerated form for clarity of the illustration and do not correspond to the preferred angular ranges of greater than 0° to maximally 2°. The purpose of the selected illustrations is to clarify the principle of the geometric relationships, without achieving a dimensionally accurate or true-to-scale rendering.

The rotor blade design presented here makes it possible to optimize the loading of a rotor blade for a high-speed low-pressure turbine of an aircraft gas turbine without the occurrence of localized stress peaks, whereby the centroids of the cross-sectional areas are located along an only slightly radially inclined stacking axis. By selecting the deviation of the stacking axis from the radial direction, a more uniform loading is achieved, the inventors having recognized that the deviations from the radial direction (respectively, from a purely radial stacking) are to be narrowly limited in the case of high-speed low-pressure turbines.

LIST OF REFERENCE NUMERALS 10 rotor blade
12 blade root element
14 shroud element
16 stream deflection portion
18 transition region
20 cross-sectional area 22 outer contour
24 centroid
26 stacking axis
28 cone
30 cylinder
32 circle
β cone angle
φ angle cylinder axis
AR axial direction
DR direction of thickness
KH cone height
RR radial direction
ZA cylinder axis
ZH cylinder height

The invention claimed is:

1. A rotor blade for a gas turbine, the rotor blade comprising:
 a blade root element; and
 a stream deflection portion adjoining the blade root element in a longitudinal direction of the blade, respective centroids of blade cross-sectional areas of the stream deflection portion residing on a common stacking axis,
 wherein, starting from a first centroid of a first blade cross-sectional area adjoining the blade root element, the stacking axis extends within a cone whose apex resides within the first centroid, the cone having a cone height extending orthogonally to a plane of the blade cross-sectional area, an angle of the cone being greater than 0° and smaller than or equal to 4°.

2. The rotor blade as recited in claim 1 wherein the cone height extends in the radial direction of the gas turbine in a mounted state of the rotor blades on the gas turbine.

3. The rotor blade as recited in claim 1 wherein the stacking axis originating from the first centroid extends linearly within the cone.

4. The rotor blade as recited in claim 2 wherein, in the mounted state of the rotor blades on the gas turbine, the stacking axis extends obliquely in an axial direction of the gas turbine relative to the radial direction.

5. The rotor blade as recited in claim 2 wherein, in the mounted state of the rotor blades on the gas turbine, the stacking axis extends obliquely in a circumferential direction of the gas turbine relative to the radial direction.

6. The rotor blade as recited in claim 1 wherein a centroid of a shroud element is also located on the stacking axis.

7. The rotor blade as recited in claim 1 wherein the stacking axis extends within the cone and the angle of the cone is greater than or equal to 0.5° and smaller than or equal to 2°.

8. A gas turbine comprising at least a turbine stage having a rotor and a plurality of adjacently disposed rotor blades circumferentially mounted upon the rotor, each of the plurality of rotor blades being the rotor blade as recited in claim 1.

9. The gas turbine as recited in claim 8 wherein the at least one turbine stage is part of a low-pressure turbine.

10. The gas turbine as recited in claim 9 wherein the low-pressure turbine is coupled by a reduction gear to a fan of an aircraft gas turbine.

11. The gas turbine as recited in claim 8 wherein the respective stacking axes of the rotor blades have a same inclination relative to a respective straight line extending radially through the first centroid of the first blade cross-sectional area.

12. An aircraft gas turbine comprising the gas turbine as recited in claim 8.

13. The rotor blade as recited in claim 1 wherein a radially outermost end of the stream deflection portion has a shroud.

14. The rotor blade as recited in claim 1 wherein the blade root element is connected to the stream deflection portion by a transition region to provide a one-piece connection.

* * * * *